US012588680B2

(12) United States Patent
Wååg

(10) Patent No.: US 12,588,680 B2
(45) Date of Patent: Mar. 31, 2026

(54) INSECTICIDAL COMPOSITION BASED ON SAPONIFIED TALL OIL AND METHOD FOR PRODUCTION THEREOF

(71) Applicant: INNOVATIVE GREEN SOLUTIONS SVERIGE AB, Partille (SE)

(72) Inventor: Åke Wååg, Stenungsund (SE)

(73) Assignee: INNOVATIVE GREEN SOLUTIONS SVERIGE AB, Partille (SE)

( * ) Notice: Subject to any disclaimer, the term of this patent is extended or adjusted under 35 U.S.C. 154(b) by 310 days.

(21) Appl. No.: 18/044,795

(22) PCT Filed: Oct. 29, 2021

(86) PCT No.: PCT/EP2021/080167
§ 371 (c)(1),
(2) Date: Mar. 10, 2023

(87) PCT Pub. No.: WO2022/090489
PCT Pub. Date: May 5, 2022

(65) Prior Publication Data
US 2023/0354823 A1 Nov. 9, 2023

(30) Foreign Application Priority Data

Oct. 30, 2020 (EP) ..................................... 20204821
Oct. 30, 2020 (SE) ................................... 2051263-8

(51) Int. Cl.
| | |
|---|---|
| *A01N 65/06* | (2009.01) |
| *A01N 25/08* | (2006.01) |
| *A01N 61/00* | (2006.01) |
| *A01P 7/04* | (2006.01) |

(52) U.S. Cl.
CPC ............ *A01N 65/06* (2013.01); *A01N 25/08* (2013.01); *A01N 61/00* (2013.01); *A01P 7/04* (2021.08)

(58) Field of Classification Search
None
See application file for complete search history.

(56) References Cited

U.S. PATENT DOCUMENTS

| | | | |
|---|---|---|---|
| 2,745,827 A | 5/1956 | Bestul et al. | |
| 4,874,610 A | 10/1989 | Cousin | |
| 5,118,506 A | 6/1992 | Eichoefer | |
| 6,759,370 B1 | 7/2004 | Innes | |
| 9,962,353 B2 | 5/2018 | Vuorenmaa | |
| 2005/0084545 A1 | 4/2005 | Pipko et al. | |
| 2008/0070823 A1* | 3/2008 | Gorlin ..................... | C11D 1/83 |
| | | | 510/499 |
| 2010/0072668 A1 | 3/2010 | Andriessen | |
| 2016/0250171 A1 | 9/2016 | Vuorenmaa | |
| 2016/0298054 A1* | 10/2016 | Rintola .................. | A01N 65/08 |

FOREIGN PATENT DOCUMENTS

| | | |
|---|---|---|
| CN | 1183897 | 6/1998 |
| CN | 105636602 | 6/2016 |
| CN | 106172485 A | 12/2016 |
| EP | 1586624 A1 | 10/2005 |
| EP | 3127581 | 2/2017 |
| LT | 4744 B | 12/2000 |
| RU | 2191200 C1 | 10/2002 |
| SE | 520908 C2 | 9/2003 |
| WO | WO1999053764 A2 | 10/1999 |
| WO | WO1999053764 A3 | 12/1999 |
| WO | WO2015059350 | 4/2015 |
| WO | WO2016148627 A1 | 9/2016 |
| WO | WO2020257858 | 12/2020 |

OTHER PUBLICATIONS

USPTO's PE2E Search machine translation of CN 1183897 (Jun. 10, 1998).*
ESPACENET machine translation of CN 1183897 (Jun. 10, 1998).*
Norlin, L.H., "Tall Oil": in Ullmann's Encyclopedia of Industrial Chemistry, Wiley-VCH Verlag GmbH & Co, 2012.*
Shahzad et al., "Nanoformulations and their mode of action in insects: A review of biological interactions," Drug Chem. Toxicol., vol. 44, No. 1, 2021, pp. 1-11.
Siegler, et al., "Some insecticidal properties of the fatty acid series," J. Agric. Res., vol. XXIX, No. 5, 1924, pp. 1-3.
European Search Report mailed May 3, 2021 by the European Patent Office for Application No. 20204821.1 filed on Oct. 30, 2020 (Applicant Innovative Green Solutions Sverige AB) (11 pages).
International Search Report and Written Opinion were mailed on Feb. 4, 2022 by the International Searching Authority for International Application No. PCT/EP2021/080167 filed on Oct. 29, 2021 (Applicant Innovative Green Solutions Sverige AB) (19 pages).
International Search Report and Written Opinion were mailed on Feb. 16, 2022 by the International Searching Authority for International Application No. PCT/EP2021/080173 filed on Oct. 29, 2021 (Applicant Innovative Green Solutions Sverige AB)(19 pages).
"Tall oil—Wikipedia" (last edited Apr. 4, 2020) Retrieved from https://web.archive.org/web/20200804163643/https://en.wikipedia.org/wiki/Tall_oil on. Retrieved on Apr. 20, 2021 from the Wayback Machine.
Xie, Y. "Diterpene Resin Acids: Major Active Principles in Tall Oil Against Variegated Cutworm, Peridroma Saucia (Lepidoptera: Noctuidae" J. of Chem. Biol. vol. 19., No. 6 1993 pp. 1075-1084.

(Continued)

*Primary Examiner* — John Pak

(74) *Attorney, Agent, or Firm* — Ballard Spahr LLP

(57) ABSTRACT

Described is a saponified tall oil that can be used as an insecticide. Also described is an insecticide that contains a saponified tall oil. Also described is to a method for producing a composition or an insecticide containing the saponified tall oil. The method includes: providing a heated basic solution of water and lye; and performing saponification by adding tall oil to the heated basic solution during mixing, to form a saponified solution.

19 Claims, 3 Drawing Sheets

(56) References Cited

OTHER PUBLICATIONS

Malvern Panalytical, "Zetasizer Nano upgrade," 2025, retrieved from the Internet: https://malvernpanalytical.com/en/support/product-support/zetasizer-range/zetasizer-nano-range/upgrade.

Snell, F.D., et al., "Physical-Chemical properties of tall-oil soap solutions," The Journal of the American Oil Chemists' Society, vol. 27(3), pp. 73-74 (1950).

Sylvatal(TM) D40LR Distilled Tall Oil Product Data Sheet, Kraton Corp, pp. 1-2 (2018).

* cited by examiner

INSECTICIDAL COMPOSITION BASED ON SAPONIFIED TALL OIL AND METHOD FOR PRODUCTION THEREOF

CROSS-REFERENCE TO RELATED APPLICATIONS

This application is a U.S. National Phase Application of International Application No. PCT/EP2021/080167, filed Oct. 29, 2021, which claims priority to European Application No. 20204821.1, filed Oct. 30, 2020, and Swedish Application No. 2051263-8, filed Oct. 30, 2020, each of which are hereby incorporated by reference in their entirety.

FIELD OF THE INVENTION

The present invention relates generally to an insecticide. The present invention relates in particular to the use of a saponified tall oil as an insecticide, and to an insecticide comprising a saponified tall oil. The invention further relates to a method for producing a composition by saponification by means of tall oil. The invention more particularly relates to a method of killing, controlling and/or repelling insects, pests and/or vermin using such insecticide or composition.

BACKGROUND OF THE INVENTION

Insects and plant pests, such as e.g. lice, ticks, mites, aphides, bark beetles and pine weevils may attack untreated and unprotected trees and plants. Moreover, indoor bugs, such as e.g. bed bugs, may contaminate entire rooms in houses and buildings, e.g. by dwelling in the interior walls of the house/building. In order to prevent, stop or reduce the caused damage of such pests and vermin, it is conventional to apply, e.g. by spraying, a compound being e.g. a pesticide, insecticide, or a fungicide on the target object. Over the years, both toxic (e.g. halogenated or phosphorylated hydrocarbons, or synthetic compounds such as organochlorine e.g. DDT) and non-toxic (various oils) compounds have been used to control and mitigate the caused damage on e.g. trees and plants. Environmentally friendly compounds, and in particular non-toxic agents, are preferred as they represent ecologically sound alternatives to the use of toxic and environmental harmful compounds.

WO 2006/052228 discloses a compound for the use with systemic pesticides, insecticides, and fungicides, and a method of application on animals, birds, trees, plants, fruits and vegetables. The compound comprises at least one surfactant and at least one high terpene containing natural oil. By using a natural oil, the environmental damages can be reduced compared to using e.g. synthetic compounds as DDT.

Even though natural oils as adjuvant or agent in compounds such as pesticides, insecticides, and fungicides have been proven to reduce the caused damage of pests and/or vermin, there are still problems with e.g. the effectiveness, the stability of the compound and costs associated with the production of the compound. Thus, there is a need in the industry for an improved compound for the control of pests and/or vermin and/or for an improved method in producing such compound.

SUMMARY

An object of the present invention is to overcome the above problems, and to provide a use of an insecticide, an insecticide, and a method for producing a composition, which to at least some extent is improved compared to prior art solutions. The invention is also accomplished by the means of a composition and method of killing, controlling and/or repelling insects and/or pests and/or vermin.

According to a first aspect of the present invention, a saponified tall oil is used as an insecticide.

The inventor has realized that saponified tall oil has advantageous effects as an insecticide. That is, the saponified tall oil is particularly effective for killing, controlling and/or repelling insects, pests and/or vermin, outdoor on e.g. trees and plants, as well as indoor. Thus, the harm caused by such insects, pests and/or vermin can be better controlled. The saponified tall oil may e.g. be used to kill, control and/or repel at least one of the following: lice, ticks, bed bugs, mites, aphides, bark beetles and pine weevils. The use of the saponified tall oil as an insecticide may advantageously be used for repelling plant pests or insects (e.g. bark beetle or pine weevil) on trees and plants, e.g. outdoor, as well as used for pests and/or vermin (e.g. bed bugs) on the interior of a house or building (i.e. indoor). Even though the effect of repelling insects, pests and/or vermin is explicitly mentioned, the saponified tall oil may additionally or alternatively have the effect of killing and/or controlling the insects, pests and/or vermin. The insecticide may be defined as a composition used for killing, controlling and/or repelling at least insects. The saponified tall oil may additionally be used as a pesticide.

According to at least one example embodiment, the saponified tall oil comprises at least 10 wt % saponified resin acids as compared to the total weight of the tall oil.

The use of such relatively high amount of resin acids is believed to result in a saponified tall oil which is particularly effective for use as an insecticide. Thus, the tall oil used for the saponified tall oil comprises at least 10 wt % resin acids as compared to the total weight of the used tall oil. That is, the weight of resin acids is compared to the total weight of the used tall oil. The saponified tall oil may comprise between 10 wt % and 25 wt %, or between 10 wt % and 20 wt %, e.g. over 15 wt %, or between 15 wt % and 25 wt %, or between 15 wt % and 20 wt %, resin acids as compared to the total weight of the tall oil. By using a tall oil with less than 10 wt % resin acids, a saponified tall oil with less advantageous effects is formed, e.g. a result of inferior micelle formation (described more in detail below). By using a tall oil with more than 25 wt % resin acids, a saponified tall oil with less advantageous effects is formed, e.g. by having a too high viscosity and/or being gelatinous, which aggravates the application of the saponified tall oil onto an object to be treated. Thus, a tall oil comprising resin acids between 10 wt % and 25 wt % is preferred for achieving the desired characteristic of the saponified tall oil.

It should be understood that the resin acids are typically differentiated from the fatty acids also comprised in the tall oil. The tall oil typically includes rosins, which comprises resin acids (e.g. abietic acid and its isomers) and fatty acids (e.g. palmitic acid, oleic acid and linoleic acid). Moreover, rosins may comprise fatty alcohols, unsaponifiable sterols, some sterols, and other alkyl hydrocarbon derivates. The resin acids typically include at least one of the following compounds: abietic acid, dehydroabietic acid, levopimaric acid, neoabietic acid, pimaric acid and isopimaric acid.

According to at least one example embodiment, the tall oil is obtained as a by-product of the kraft process of wood pulp manufacture originating from black liquor. The tall oil may be a tall oil crude. An example of tall oil used according to the present invention is tall oil with CAS-number 8002-26-4. According to at least one example embodiment, the tall oil includes synthetic pine oil. The synthetic pine oil may be an essential oil obtained by e.g. steam distillation of various parts of the pine tree (various species of pine tree are applicable, but in particularly *Pinus sylvestris*), and which comprises at least 10 wt % resin acids (natural or added).

According to at least one example embodiment, the saponified tall oil comprises saponified fatty acids. That is, the tall oil used for the saponified tall oil may comprise fatty acids in addition to the resin acids. According to at least one example embodiment, the tall oil used for the saponified tall oil comprises more fatty acids then resin acids.

According to at least one example embodiment, the saponified tall oil is a saponified solution of lye and tall oil.

Hereby, an efficient means for providing the saponified tall oil is provided. By using lye for providing a saponified solution of lye and tall oil, the production of the saponified tall oil may be carried out in a relatively cost efficient manner.

According to at least one example embodiment, the saponified solution comprises a ratio (w/w) of saponified lye to tall oil between 0.2 and 1.5.

That is, the ratio of lye to tall oil used for the saponified solution is between 0.2 and 1.5. Such ratio (w/w) results in a saponified tall oil, or saponified solution, which is particularly effective for use as an insecticide, and believed to be advantageous for the particular micelle formation (described below). According to at least one example embodiment, the saponified solution comprises a ratio (w/w) of saponified lye to tall oil between 0.5 and 1.5, such as e.g. between 0.5 and 1.

According to at least one example embodiment, the lye is sodium hydroxide or potassium hydroxide.

Hereby, an efficient means for providing the saponified tall oil is provided, as readily available lye is used.

According to at least one example embodiment, the saponified solution comprises between 10 wt % and 25 wt % saponified tall oil.

That is, the amount of tall oil used for the saponified solution is between 10 wt % and 25 wt %. The weight of the saponified tall oil is compared to the total weight of the (undiluted) saponified solution. That is, the weight of the tall oil used for the saponified solution compared to the total weight of the (undiluted) saponified solution. Such amount of the saponified tall oil results in a saponified tall oil, or saponified solution, which is particularly effective for use as an insecticide, and believed to be advantageous for the particular micelle formation (described below).

According to at least one example embodiment, the saponified solution comprises between 5 wt % and 15 wt % saponified lye.

That is, the amount of lye used for the saponified solution is between 5 wt % and 15 wt %. The weight of the saponified lye is compared to the total weight of the (undiluted) saponified solution. That is, the weight of the lye used for the saponified solution compared to the total weight of the (undiluted) saponified solution. Such amount of the saponified lye results in a saponified solution, which is particularly effective for use as an insecticide, and believed to be advantageous for the particular micelle formation (described below).

According to at least one example embodiment, the saponified solution is a saponification of tall oil and a basic solution comprising lye and at least 50 wt % water or deionized water.

That is, the amount of water or deionized water (hereafter simply referred to as water) in the basic solution used for the saponified solution is at least 50 wt %. The weight of the water is compared to the total weight of the basic solution. That is, the weight of the water in the basic solution used for the saponified solution compared to the total weight of the basic solution. Such amount of water results in an advantageous saponified solution. It should be understood that the amount of water in the basic solution may be higher than 50 wt %, and that 50 wt % is a minimum amount. For example, the amount of water in the basic solution is at least 70 wt %, or at least 80 wt %, or at least 90 wt %, as compared to the total weight of the basic solution. For example, the amount of water in the basic solution is between 75 wt % and 95 wt %, as compared to the total weight of the basic solution.

According to at least one example embodiment, the saponified solution comprises between 10 wt % and 25 wt % saponified tall oil, and between 5 wt % and 15 wt % saponified lye. Thus, the saponified solution comprises saponified tall oil and saponified lye.

The saponified solution may furthermore comprise between 60 wt % and 85 wt % water, as compared to the total weight of the saponified solution. Thus, the weight of the tall oil used for the saponified solution may be between 10 wt % and 25 wt %, the weight of the lye used for the saponified solution may be between 5 wt % and 15 wt %, and the amount of water used in the saponified solution may be between 60 wt % and 85 wt %, as compared to the total weight of the saponified solution.

According to at least one example embodiment, the saponified solution is a saponification of tall oil and a basic solution comprising lye and at least 50 wt % water or deionized water, wherein the amount of tall oil used in the saponification is between 10 wt % and 25 wt %, the amount of the lye used for the saponification is between 5 wt % and 15 wt %, and the amount of water used in the saponification is between 60 wt % and 85 wt %, as compared to the total weight of the saponified solution. Thus, the saponified solution comprises saponified tall oil and a saponified basic solution of lye and water.

According to at least one example embodiment, the saponification of the saponified solution has been performed by adding tall oil to the basic solution, and wherein the basic solution is preheated.

Such saponification results in an improved saponified tall oil, or saponified solution, which is particularly effective for use as an insecticide, and believed to be advantageous for the particular micelle formation (described below).

According to at least one example embodiment, the addition of tall oil to the preheated basic solution has been performed at a temperature interval T of between 80° C. and 100° C., preferably between 85° C. and 97° C., and more preferably between 90° C. to 95° C.

Such saponification results in an improved saponified tall oil, or saponified solution, which is particularly effective for use as an insecticide, and believed to be advantageous for the particular micelle formation (described below). The temperature interval may e.g. refer to the time-averaged values used during the addition of the tall oil to the preheated basic solution. According to another example, the temperature interval is kept for at least a majority of the time required for the addition of tall oil to the preheated basic solution, such as e.g. during 90% of the time. The temperature interval T may be maintained during the whole saponification process. Again, this is believed to improve the micelle formation. According to at least one example embodiment, the addition of tall oil to the preheated basic solution, and any subsequent mixing, is adapted such that the temperature interval T is maintained, at least during 90% of the time.

According to at least one example embodiment, the saponified solution has been treated with at least one stabilizer and/or at least one pH adjuster.

Such saponification results in an improved saponified tall oil, or saponified solution. For example, the amount of the at least one stabilizer and/or the at least one pH adjuster is between 0.1 wt % and 2 wt % as compared to the total weight of the (undiluted) saponified solution.

According to at least one example embodiment, the saponified tall oil is undiluted or diluted with water to a concentration of between 1% and 99% defined as the weight ratio of the undiluted solution to the weight of the diluted solution.

Thus, for at least some embodiments in which the saponified tall oil is comprised in a saponified solution, the saponified solution undiluted or diluted with water to a concentration of between 1% and 99% defined as the weight ratio of the undiluted solution to the weight of the diluted solution.

It should be understood that the water used for diluting the saponified tall oil, or saponified solution, is in principle differentiated from the water used in the basic solution prior to the saponification.

Thus, the saponified tall oil, or saponified solution, may be used undiluted or diluted.

According to at least one example embodiment, the saponified tall oil, or saponified solution, is used as an insecticide for flies, aphides, and/or bark beetles or pine weevils.

Without being bound by any theory, the inventor believes that a saponified tall oil, or saponified solution, as described above, is advantageous due to the presence of particular micelles which has been formed during the production of the saponified tall oil, or saponified solution. The micelles are believed to be particularly efficient for killing, controlling and/or repelling insects, pests and/or vermin, e.g. lice, ticks, bed bugs, mites, aphides, bark beetles and pine weevils.

According to a second aspect of the invention, an insecticide comprising a saponified tall oil is provided.

Effects and features of the second aspect of the invention are largely analogous to those described above in connection with the first aspect of the invention. Embodiments mentioned in relation to the first aspect of the invention are largely compatible with the second aspect of the invention, of which some are exemplified below, typically without repeating any advantageous effects.

According to at least one example embodiment, the saponified tall oil comprises at least 10 wt % saponified resin acids as compared to the total weight of the tall oil.

According to at least one example embodiment the saponified tall oil is a saponified solution of lye and tall oil.

According to at least one example embodiment, the saponified solution comprises a ratio (w/w) of saponified lye to tall oil between 0.2 and 1.5.

According to at least one example embodiment, the lye is sodium hydroxide or potassium hydroxide.

According to at least one example embodiment, the saponified solution comprises between 10 wt % and 25 wt % saponified tall oil.

According to at least one example embodiment, the saponified solution comprises between 5 wt % and 15 wt % saponified lye.

According to at least one example embodiment, the saponified solution is a saponification of tall oil and a basic solution comprising lye and at least 50 wt % water or deionized water.

According to at least one example embodiment, the saponification of the saponified solution has been performed by adding tall oil to the basic solution, and wherein the basic solution is preheated.

According to at least one example embodiment, the addition of tall oil to the preheated basic solution has been performed at a temperature interval T of between 80° C. and 100° C., preferably between 85° C. and 97° C., and more preferably between 90° C. to 95° C.

According to at least one example embodiment, the saponified solution has been treated with at least one stabilizer and/or at least one pH adjuster.

According to at least one example embodiment, the saponified tall oil is undiluted or diluted with water to a concentration of between 1% and 99% defined as the weight ratio of the undiluted solution to the weight of the diluted solution.

According to a third aspect of the present invention, a method for producing a composition is provided. The method comprises:

providing a preheated basic solution of water and lye;

performing saponification by adding tall oil to the preheated basic solution during mixing, to form a saponified solution;

wherein the ratio (w/w) of lye to tall oil used for the saponified solution is between 0.2 and 1.5.

According to at least one example embodiment, the tall oil used for the saponified solution comprises at least 10 wt % resin acids as compared to the total weight of the tall oil.

According to at least one example embodiment, the lye in the preheated basic solution is sodium hydroxide or potassium hydroxide.

According to a fourth aspect of the present invention, a method for producing a composition is provided. The method comprises:

providing a preheated basic solution of water and lye of either sodium hydroxide or potassium hydroxide;

performing saponification by adding tall oil to the preheated basic solution during mixing, to form a saponified solution;

wherein the tall oil comprises between 10 and 25% resin. It should be understood that when stating that the tall oil comprises between 10 and 25% resin, the tall oil comprises between 10 and 25% (w/w) of resin acids, i.e. between 10 wt % and 25 wt % as compared to the total weight of the tall oil.

Effects and features of the third and fourth aspect of the invention are largely analogous to those described above in connection with the first and second aspects of the invention. Embodiments mentioned in relation to the first and second aspects of the invention are largely compatible with the third and fourth aspects of the invention, of which some are exemplified below, typically without repeating any advantageous effects. In particular, any embodiments related to the tall oil or lye and the amount thereof is applicable to the third and fourth aspects of the invention. In the following, embodiments for the third and fourth aspect of the invention are descried in common.

By a method according to the third and fourth aspects of the invention, a composition having advantageous effects is achieved, e.g. in controlling the harm caused by insects, pests and/or vermin, outdoor on e.g. trees and plants, as well as indoor, controlling e.g. the harm caused by bedbugs. Moreover, the production of the composition is relatively cost efficient, as it is water-based, comprises readily available lye and employs saponification for achieving the desired characteristic of the composition. The resulting composition has furthermore the appropriate characteristics (being a water-based aqueous composition) to be used for easy application onto an object, e.g. by spraying or brushing, as well as being relatively environmentally friendly and non-toxic.

Without being bound by any theory, the inventor believes that the used ratio (w/w) of lye to tall oil for the saponified solution between 0.2 and 1.5, and/or using a tall oil with an amount of resin acids between 10 and 25% (w/w) for the saponified solution, results in the formation of micelles during the production of the composition, which micelles are particularly efficient for killing, controlling and/or repelling insects, pests and/or vermin, e.g. lice, ticks, bed bugs, mites, aphides, bark beetles and pine weevils. It should be noted that the composition produced by the method according to the third and fourth aspects of the invention, especially related to the used ratio (w/w) of lye to tall oil for the saponified solution between 0.2 and 1.5 and/or the specific resin acid content of the tall oil and the formation of the micelles, may advantageously be used for repelling plant pests or insects (e.g. bark beetle or pine weevil) on trees and plants, e.g. outdoor, as well as used for pests and/or vermin (e.g. bed bugs) on the interior of a house or building (i.e. indoor). Even though the effect of repelling insects, pests and/or vermin is explicitly mentioned, the composition may additionally or alternatively have the effect of killing and/or controlling the insects, pests and/or vermin.

By using a tall oil with less than 10% (w/w) resin acids, a composition with less advantageous effects is formed, e.g. a result of inferior micelle formation. By using a tall oil with more than 25% (w/w) resin acids, a composition with less advantageous effects is formed, e.g. by having a too high viscosity and/or being gelatinous, which aggravates the application of the composition onto an object. Thus, a resin acid content of between 10% and 25% (w/w) is preferred for achieving the desired characteristic of the composition. According to at least one example embodiment, the tall oil used for the saponification comprises between 15% and 25% (w/w) resin acids, or between 15% and 20% (w/w) resin acids. According to at least one alternative example embodiment, the tall oil comprises between 10% and 20% (w/w) resin acids, or between 20% and 25% (w/w) resin acids.

According to at least one example embodiment, the lye is potassium hydroxide.

By using potassium hydroxide, the resulting composition has preferred surface characteristics (e.g. by being more slippery compared to using sodium hydroxide).

It should be noted that the heated or preheated basic solution of water and lye may be provided by various means, e.g. by providing pre-heated water and adding lye, and/or by heating the water (or solution) as lye is added to the water. According to at least one example embodiment, the temperature of the heated basic solution is maintained during the step of saponification. Heating may be provided by a heating means, such as e.g. an external heater.

According to at least one example embodiment, the preheated basic solution of water and lye is within a temperature interval T between 80° C. and 100° C., preferably between 85° C. and 97° C., and more preferably between 90° C. to 95° C.

By means of the temperature interval T, a composition having advantageous effects is achieved. Moreover, by the temperature interval T, a proper saponification is achieved together with an adequate mixing of the tall oil with the lye. Without being bound by any theory, the inventors believe that the previously described formation of micelles may be temperature dependent, and that by carefully keeping the temperature of the solution within the temperature interval T, the formation of the micelles can be optimized. In other words, using a temperature interval T which extends below 80° C., or below 85° C., or below 90° C. may result in an inferior saponification and/or inferior micelle formation, and using a temperature interval T which extends above 95° C., or 97° C., or 100° C., the risk of boiling and/or excessive evaporation is increased. The latter is believed to result in an inferior saponification and/or inferior micelle formation. Thus, the method may be characterised by producing a micelle-based liquid by saponification of the tall oil and the heated basic solution.

It should be noted that the temperature may, for a short period of time, be outside of the temperature interval T. Thus, by stating that a solution is maintained within a temperature interval T during a certain activity/step, or by performing an activity/step within the temperature interval T, at least the temperature interval T is sustained for a majority of the activity/step, such as e.g. during at least 90% or at least 95% or at least 99% of the activity/step (i.e. of the elapsed time associated with the activity/step). The temperature interval T may be referred to as a temperature range T. Thus, the terms temperature interval and temperature range is used interchangeably throughout the description.

According to at least one example embodiment, the saponification is carried out in a closed vessel, preventing evaporation and a resulting undesired thickening of the solution.

According to at least one example embodiment, the saponification is carried out within the temperature range T.

In other words, the temperature range T is maintained during the saponification. Again, this is believed to improve the micelle formation.

According to at least one example embodiment, the addition of tall oil, and mixing, is adapted such that the temperature range T is maintained during the saponification.

That is, the step of adding the tall oil and mixing is carried out such that the temperature range T is maintained during the saponification. For example, if tall oil at a temperature lower than that of the heated basic solution is added to the heated basic solution, there is a risk of a sudden temperature drop of the solution, at least in parts of the solution, which may risk the temperature to, at least locally, drop below the temperature range T for a too long time. Moreover, by too excessive mixing or stirring, the temperature of the solution may become too high and/or air may be undesirably drawn or sucked into the solution, causing an undesired reaction between oxygen and components in the solution. Correspondingly, too poor mixing or stirring could lead to an inferior mixing of the tall oil in the heated basic solution, and thus to an inferior saponification and/or micelle formation. According to at least one example embodiment, the mixing is carried out using a stirrer rotating between 25 and 75 rpm.

According to at least one example embodiment, the addition of tall oil is carried out over a time span of between 5 and 15 minutes, such as e.g. between 8 and 12 minutes.

Such timely addition of the tall oil is advantageous for the saponification as the risk of agglomeration of the tall oil into lumps is reduced. For example, between 5 and 20% of the tall oil (e.g. based on volume) is added per minute, preferably continuously.

According to at least one example embodiment, the method comprises: homogenizing the heated basic solution with the added tall oil, by mixing for a predetermined time.

Hereby, an improved saponification is achieved, possibly together with an improved formation of micelles. The step of homogenizing the heated basic solution with the added tall oil may form a part of the saponification procedure. Thus, homogenizing may be carried out while keeping the temperature T of the solution. According to at least one example embodiment, homogenization is carried out for between 30 minutes and 2 hours. The step of homogenization may be carried out for a longer time than 2 hours, e.g. 3 hours, if it is necessary for completing the saponification. According to at least one example embodiment, the step of homogenizing is carried out until the saponification is complete. According to at least one example embodiment, the homogenizing may be referred to as incubation.

According to at least one example embodiment, the composition has a pH of between 8.5 and 11 at 20° C.

Such pH results in advantageous effects of the composition, and is believed to result in improved formation of the micelles.

According to at least one example embodiment, the method comprises: adding at least one stabilizer and/or at least one pH adjuster to the saponified solution.

Hereby, a stable composition is provided and/or the pH may be desirably adjusted. As the pH itself may have a stabilizing effect on the composition, depending on the properties and characteristic thereof, the pH adjuster may be considered as a stabilizer. By adding at least one stabilizer and/or at least one pH adjuster, the formation of the micelles, and/or the stability of the micelles in the solution, is believed to be improved.

According to at least one example embodiment, the temperature of solution or saponified solution, is maintained within temperature range T at least up to the step of adding at least one stabilizer and/or at least one pH adjuster. However, as the stabilizer and/or pH adjuster is added, the temperature of the solution is according to at least one example embodiment brought below the lower range of the temperature range T. For example, the method may comprise initiating cooling of the solution just prior to, simultaneously with, or just subsequent to, the step of adding at least one stabilizer and/or at least one pH adjuster to the saponified solution. The cooling may be natural or forced. This may improve the previously described effect of the composition for killing, controlling and/or repelling insects, pests and/or vermin.

According to at least one example embodiment, the saponified solution comprising the added stabilizer and/or pH adjuster, is maintained in rest for a predetermined time, e.g. 5 to 10 minutes. According to one theory, this improves the formation and/or stability of the micelles.

According to at least one example embodiment, the method comprises adding at least one of the following to the saponified solution: a base, such as an amine, e.g. an ethanolamine or any derivates thereof; a diol, such as a glycol-based compound based on e.g. ethane or propane. This step is preferably comprised in the step of adding at least one stabilizer and/or at least one pH adjuster to the saponified solution. That is, the stabilizer and/or pH adjuster is preferably the base, such as an amine, e.g. an ethanolamine or any derivates thereof, and/or the diol, such as a glycol-based compound based on e.g. ethane or propane. By adding a base and/or a diol, the formation of the micelles, and/or the stability of the micelles in the solution, is believed to be improved (e.g. by achieving a clearing point or clearing point temperature of below 5° C.). The base and/or diol is preferably added in a respective amount within 0.1 to 2 wt %, or within 0.5 to 1.5 wt %, or within 0.8 to 1.2 wt %, as compared to the total weight of the composition. The composition may simply be referred to as the saponified solution.

According to at least one example embodiment, the method comprises adding at least one of the following to the saponified solution: triethanolamine and propylene glycol, wherein the respective amount of the triethanolamine and propylene glycol is within 0.1 to 2 wt % as compared to the total weight of the composition.

Thus, the previously mentioned base may be triethanolamine, and the previously mentioned diol may be propylene glycol. By adding a triethanolamine and/or a propylene glycol, the formation of the micelles, and/or the stability of the micelles in the solution, is believed to be improved. Moreover, both triethanolamine and propylene glycol are readily available and relatively cost efficient components, improving the costs associated with production of the composition. The respective amount of the triethanolamine and propylene glycol may be within 0.1 to 2 wt %, or within 0.5 to 1.5 wt %, or within 0.8 to 1.2 wt %.

According to at least one example embodiment, the method comprises:
adding UREA to the saponified solution, and optionally
prior to adding UREA, cooling the saponified solution to
a temperature above room temperature,
wherein the amount of the UREA is within 0.1 to 2 wt % as compared to the total weight of the composition.

The addition of UREA in the specified amount results in advantageous effects of the composition, and is believed to improve the formation of the micelles, and/or the stability of the micelles in the solution. The amount of the UREA may be within 0.1 to 2 wt %, or within 0.5 to 1.5 wt %, or within 0.8 to 1.2 wt %. Moreover, UREA is readily available and a relatively cost efficient component, improving the cost efficiency associated with production of the composition.

The cooling of the saponified solution to a temperature above room temperature may comprise cooling to a temperature between room temperature and the temperature range T. The cooling may e.g. comprise cooling to a temperature of between 25° C. and 60° C., e.g. between 25° C. and 50° C., or between 25° C. and 40° C., such as e.g. between 30° C. and 40° C. Such a temperature is believed to improve the formation of the micelles, and/or the stability of the micelles in the solution According to at least one example embodiment, the amount of tall oil used for the saponified solution is between 10 wt % and 25 wt %.

According to at least one example embodiment, the amount of lye used for the saponified solution is between 5 wt % and 15 wt %,
The amount of tall oil and/or lye is as compared to the total weight of the composition.

According to at least one example embodiment, the amount of lye is between 5 and 15 wt % and the amount of tall oil is between 10 and 25 wt %, as compared to the total weight of the composition.

Such amounts of the lye and tall oil results in advantageous effects of the composition, and is believed to improve the saponification and the formation of the micelles, and/or the stability of the micelles in the solution. For example, the amount of lye is about 10 wt %, and the amount of tall oil is about 17 wt %.

According to at least one example embodiment, the composition is water-based. The water, typically provided via the heated basic solution, may be present in an amount of between 52 to 85 wt %, such as e.g. between 65 and 75 wt %. The amount of water as compared to the total weight of the composition.

The insecticide of the first aspect or second aspect of the invention may be produced according to the third or fourth aspects of the invention. Thus, any embodiments (step or component) described with reference to the third and fourth aspects of the invention may be inherently comprised in the saponified tall oil, or saponified solution described with reference to the first and second aspects of the invention.

According to at least a fifth aspect of the invention, a composition is provided. The composition comprises:

a saponified solution of water and lye of sodium hydroxide or potassium hydroxide, and tall oil, wherein the tall oil comprises between 10 and 25% resin. Again, it should be understood that when stating that the tall oil comprises between 10 and 25% resin, the tall oil comprises between 10 and 25% (w/w) of resin acids, i.e. between 10 wt % and 25 wt % as compared to the total weight of the tall oil.

Effects and features of the fifth aspect of the invention are largely analogous to those described above in connection with the first to fourth aspects of the invention. Embodiments mentioned in relation to the first to fourth aspects of the invention are largely compatible with the fifth aspect of the invention, of which some are exemplified below. Moreover, the embodiments with regards to the amount and specific ranges of the components in the composition or saponified solution mentioned in relation to the first to fourth aspects of the invention is applicable to the fifth aspect of the invention as well. In particular, any advantageous effects related to a specific component of the composition or saponified solution, and/or the amount thereof, mentioned in relation to the first to fourth aspects of the invention is applicable to the fifth aspect of the invention as well.

In short, again without being bound by any theory, the inventor believes that the specific amount of resin, or resin acids, improves the formation, presence and stabilization of micelles in the composition, resulting in a composition which is particularly efficient for killing, controlling and/or repelling insects, pests and/or vermin, e.g. lice, ticks, bed bugs, mites, aphides, bark beetles and pine weevils.

It should be understood that a saponified solution is a solution that has undergone saponification. In other words, the saponified solution of water and lye of e.g. sodium hydroxide or potassium hydroxide, and tall oil, is a solution in which the water and lye has been mixed with tall oil and e.g. homogenized (including e.g. neutralization of the resin acids and the hydroxide) during a predetermined time, preferably at a temperature within the temperature range T, as described with reference to the third and fourth aspects of the invention.

According to at least one example embodiment, the tall oil comprises between 15% and 25% resin, or between 15% and 20% resin, that is between 15 wt % and 25 wt % resin acids, or between 15 wt % and 20 wt % resin acids. According to at least one alternative example embodiment, the tall oil comprises between 10% and 20% resin, or between 20% and 25% resin, that is between 10 wt % and 20 wt % resin acids, or between 20 wt % and 25 wt % resin acids.

According to at least one example embodiment, the saponified solution has been produced by adding tall oil to a solution of the water and lye during mixing within a temperature range T between 80° C. and 100° C., preferably between 85° C. and 97° C., and more preferably between 90° C. to 95° C.

According to at least one example embodiment, the composition comprises, or has been produced by being treated with, at least one stabilizer and/or at least one pH adjuster.

For example, the stabilizer and/or pH adjuster is preferably a base, such as an amine, e.g. an ethanolamine or any derivates thereof, or a diol, such as a glycol-based compound based on e.g. ethane or propane.

According to at least one example embodiment, the composition comprises, or has been produced by being treated with, at least one of the following substances in the specified amount (amount as compared to the total weight of the composition):

0.1 to 2 wt % triethanolamine, 0.1 to 2 wt % propylene glycol, 0.1 to 2 wt % UREA.

According to at least one example embodiment, the amount of lye is between 5 and 15 wt % and the amount of tall oil is between 10 and 25 wt %, as compared to the total weight of the composition. That is, the amount of lye and tall oil used for the saponified solution.

It should be noted that the specified amounts of the components of the composition, the choice of additives (stabilizer, pH adjuster and/or UREA) or the like, may be varied in accordance with that presented in the first to fourth aspects of the invention. For example, any one of the triethanolamine, propylene glycol and UREA may be present in an amount between 0.1 to 2 wt %, or within 0.5 to 1.5 wt %, or within 0.8 to 1.2 wt %, as compared to the total weight of the composition.

According to at least one example embodiment, the composition has a pH in the range 8.5 to 11, such as e.g. 9 to 9.5, or 9.5 to 10, or 9.5 to 11 at 20° C.

According to at least one example embodiment, the clearing point or clearing point temperature is below 5° C., and/or the dry matter content of the composition is within 25 to 30 wt %. This may improve the previously described effect of the composition for killing, controlling and/or repelling insects, pests and/or vermin and/or provide the appropriate characteristics (being a water-based aqueous composition) to be used for easy application onto an object, e.g. by spraying or brushing.

According to at least one example embodiment, the composition is a pesticide or insecticide or a compound for killing, controlling and/or repelling pests and/or vermin such as plant pests or insects.

The inventor has realized that the composition of the third to fifth aspects of the invention, is advantageous for killing, controlling and/or repelling insects, pests and/or vermin. The inventor believes that the formed micelles in the composition are of such nature, e.g. odorous, that they affect the insects, pests and/or vermin in a desired manner. For example, the size of the formed micelles may be advantageous in obstructing the respiratory airways of the insects, pests and/or vermin, and/or the odor or smell of the composition, at least partly owing to the formed micelles, may be advantageous in causing a repelling effect of the insects, pests and/or vermin.

According to at least one example embodiment, applicable to the first to fifth aspects of the invention, the water used in the composition is preferably deionized and/or has a hardness <2 dH.

According to at least one example embodiment, applicable for the first to fifth aspects of the invention, the composition comprises a thickener or viscosity increasing substance, e.g. sodium sulphate in an amount within 0 to 2 wt %, e.g. 0 to 1 wt % (amount as compared to the total weight of the composition).

Hereby, the application characteristics of the composition, e.g. in order to be able to use it for easy application onto an object, e.g. by brushing, may be adapted.

According to at least a sixth aspect of the invention, a method of killing, controlling and/or repelling insects, pests and/or vermin is provided. The method comprises:

selecting an object to be treated;

applying an insecticide or a composition according to the first aspect and the fifth aspect of the invention, respectively or a composition produced according to the third or fourth aspects of the invention to kill, control or repel insects, pests and/or vermin on the treated object.

Effects and features of the sixth aspect of the invention are largely analogous to those described above in connection with the first to fifth aspects of the invention. Embodiments mentioned in relation to the first to fifth aspects of the invention, in particular in relation to the composition and saponified solution, are largely compatible with the sixth aspect of the invention.

The object to be treated may e.g. be a plant, a tree, or a soil in which a plant or tree is grown, and the insects, pests and/or vermin to kill, control or repel may be bark beetles and/or pine weevils. The object may alternatively be an inhouse interior, such as an interior wall, and the insects, pests and/or vermin to kill, control or repel may be bed bugs. According to at least one example embodiment, the selection of object comprises identifying an object containing a target insect, pest or vermin present in an amount sufficient to harm or reduce the growth of the object (e.g. if the object is a plant or a tree) or a plant or tree growing in the object (e.g. if the object is soil) or otherwise causing damage or harm (e.g. if the object is an interior wall of a house).

According to at least one example embodiment, the step of applying the insecticide or composition is carried out by spraying the insecticide or composition on the treated object. Spraying is advantageous as it is a relatively easy and fast application means.

According to at least one example embodiment, the step of applying the insecticide or composition is carried out by brushing the insecticide or composition on the treated object. Hereby, the risk of inhalation of the composition is reduced, at least compared to spraying. Using brushing as application means may thus preferably be used for indoor applications, e.g. application to an interior wall.

It should be noted that the insecticide or composition may be referred to as a compound, or may form a part of a compound, as is typically a liquid. According to at least one example embodiment, the insecticide or composition is a non-toxic aqueous based composition, in particular compared to synthetic compounds as e.g. DDT. According to at least one example embodiment, the insecticide or composition is an environmentally friendly substance, in particular compared to synthetic compounds as e.g. DDT.

According to at least one example embodiment, the method comprises diluting the insecticide or composition to a concentration of between 1% and 10%, e.g. between 2% and 8%, e.g. between 3% and 7% using water as diluent, prior to applying the composition to kill, control or repel insects, pests and/or vermin on the treated object (weight ratio of the undiluted insecticide or composition to the weight of the diluted insecticide or composition).

Further features of, and advantages with, the present invention will become apparent when studying the appended claims and the following description. The skilled person realize that different features of the present invention may be combined to create embodiments other than those described in the following, without departing from the scope of the present inventive concept.

BRIEF DESCRIPTION OF THE DRAWINGS

These and other aspects of the present inventive concept will now be described in more detail, with reference to the appended drawings showing an example embodiment of the inventive concept, wherein.

DETAILED DESCRIPTION OF EXAMPLE EMBODIMENTS

In the present detailed description, various embodiments of the invention are mainly described with reference to method for producing a composition, such as an insecticide. The invention is also described with reference to the use of a saponified tall oil, or a saponified solution of saponified tall oil, as an insecticide, and a method of killing, controlling and/or repelling insects, pests and/or vermin.

Figure 1:
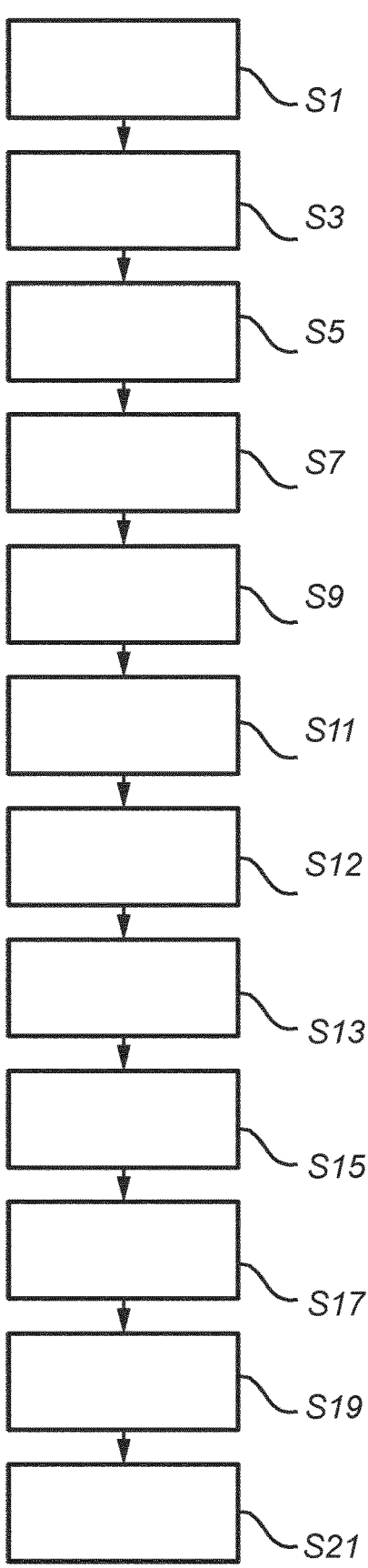
FIG. 1 is a flow chart in accordance with at least one example embodiment of the present invention.

FIG. 1 is a flow-chart including steps of a method for producing a composition in accordance with at least one example embodiment of the invention.

In a step S1, a predetermined amount of water is provided and heated to a temperature within a temperature range T between 90 and 95° C. During the step S1, or in a subsequent separate step S3, lye of potassium hydroxide is added to the water. As a result, a heated basic solution of water and lye of potassium hydroxide is provided in a step S5.

In a step S7, tall oil is added to the heated basic solution during mixing or stirring. The tall oil comprises between 10% and 25% resin, e.g. about 15% resin, that is between 10 wt % and 25 wt %, e.g. about 15 wt % resin acids. During the step S7, or in a subsequent separate step S9, the heated basic solution with the added tall oil is homogenized, or incubated, by mixing or stirring for a predetermined time of at least 30 minutes, typically 1 hour. As a result, saponification is achieved resulting in a saponified solution.

The addition of tall oil in step S7 is preferably carried out over a time span of between 5 and 15 minutes, e.g. about 10 minutes. Thus, between 5 and 20% of the tall oil is added every minute (e.g. based on volume of total tall oil added), preferably continuously. Hereby, the risk of agglomeration of the tall oil into lumps is reduced. The mixing or stirring in step S7 is preferably carried out by a stirring means, e.g. a magnetic stirrer or impeller, rotating with 25-75 rpm.

It should be noted that the temperature of the solution in step S7, and S9, is maintained within the temperature range T. Thus, the temperature of the solution is actively maintained above 90° C. and below 95° C. In other words, the addition of tall oil, and mixing or stirring, is adapted such that the temperature range T is maintained during the saponification.

In a step S11, the pH of the saponified solution is determined or measured. The pH, at 20° C., should be between 8.5 and 11, for example between 9 and 9.5. Thus, in response of determining that the pH is outside of the specified range, the method may comprise a step S13 of adjusting the pH of the saponified solution. Such an adjustment may comprise adding more tall oil or lye.

In a step S15, triethanolamine is added to the saponified solution, and in a step S17, propylene glycol is added to the saponified solution (already including the triethanolamine). The triethanolamine and propylene glycol is acting as stabilizer and/or pH adjuster in the saponified solution.

In a step S19, the saponified solution, including any reactants and products of the added triethanolamine and propylene glycol, is cooled down to a cooled temperature between room temperature and the temperature range T, e.g. to be between 30° C. and 40° C. Preferably, the cooling is carried out by natural cooling, but using an external cooling circuit for forced cooling of the solution is within the scope of the invention.

In a step S21, UREA is added to the saponified solution at the cooled temperature, whereby the solution is further cooled down to below 30° C., to provide the resulting composition.

Optionally, depending on the desired viscosity of the composition, a thickener, such as sodium sulphate is added to the composition, preferably subsequent to step 21.

It should be noted that steps presented herein, need not to, but may according to one example embodiment, be carried out in the consecutive order as represented by the numbering of the steps.

The amount of respective component in the resulting composition is given in Table 1. Thus, table 1 represents an example embodiment of a composition according to the invention, the composition being a saponified solution of water and lye of potassium hydroxide, and tall oil.

TABLE 1

| Component | Amount in wt % |
|---|---|
| Potassium hydroxide | 5-15 |
| Tall oil (about 15 wt % resin acids) | 10-25 |
| Triethanolamine (at least 90% pure TEA) | 0.1-2 |
| Propylene glycol | 0.1-2 |
| UREA | 0.1-2 |
| Sodium sulphate | 0-2 |
| Water (deionized, <2° dH) | Required amount for achieving 100% |

According to at least one example embodiment, an example composition of the invention comprises 9 wt % potassium hydroxide, 17 wt % tall oil, 1 wt % triethanolamine, 1 wt % propylene glycol, 0.5 wt % UREA and 71.5 wt % water.

The composition of Table 1 is preferably a pesticide or insecticide or a compound for killing, controlling and/or repelling insects, pests and/or vermin such as plant pests or insects, as will be further described with reference to FIGS. 2A and 2B.

Figure 2B:
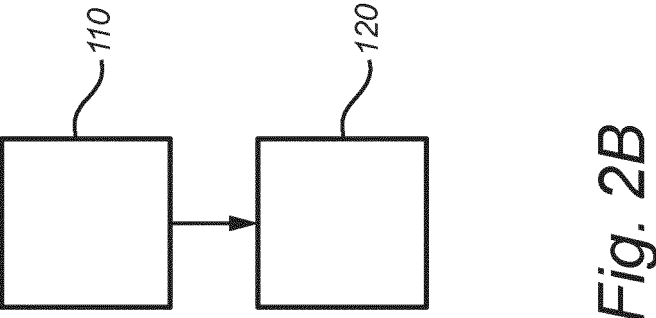
FIG. 2B is a flow chart in accordance with at least yet another example embodiment of the present invention.
Figure 2A:
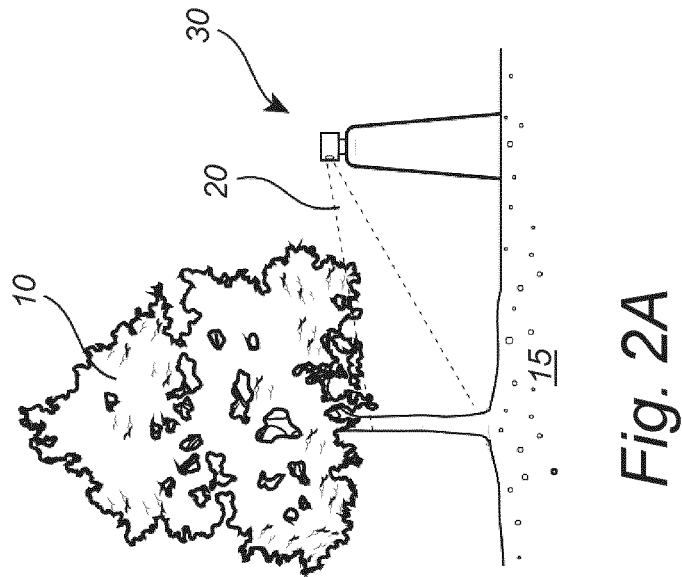
FIG. 2A schematically illustrates treatment of an object with the composition in accordance with at least one embodiment of the invention.
Figure 3:
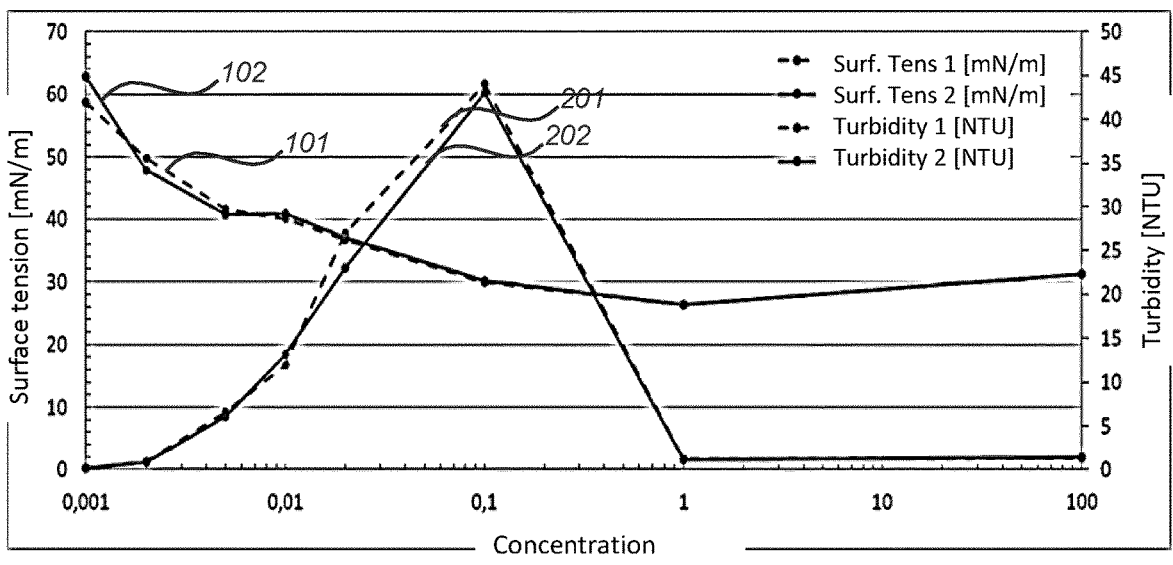
FIG. 3 is a graph showing the surface tension and turbidity for a composition according to example embodiments of the invention.
Figure 4:
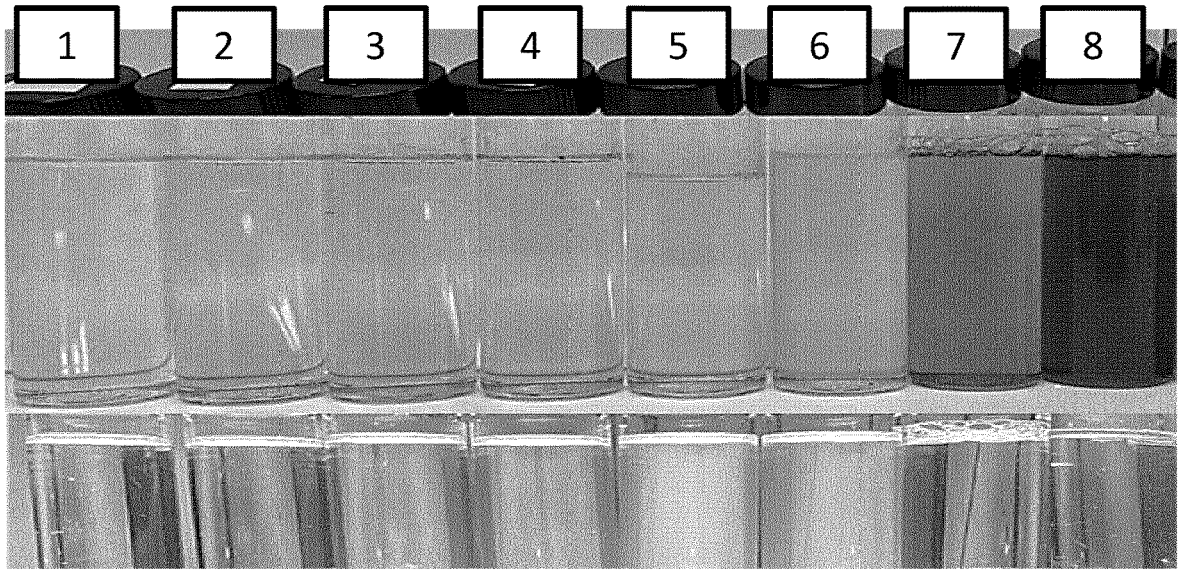
FIG. 4 is a photograph showing solubility of dye for a composition according to example embodiments of the invention.

FIG. 2A is a perspective view of an object 10, here being a plant 10 growing in soil 15, treated with the composition 20 of Table 1 in order to kill, control and/or repel plant pests or insects being present on the object. The composition 20 may be referred to as an insecticide 20. The composition 20 is in FIG. 2A applied to the plant 10 by means of a spraying device 30. Instead of applying the composition 20 on the plant 10, the composition may be applied to the soil 15.

FIG. 2B schematically illustrates the steps of a method of killing, controlling and/or repelling plant pests or insects on an object 10. The method comprising a first step 110 of selecting an object 10 to be treated, and a second step 120 of applying the composition 20 to kill, control or repel plant pests or insects on the treated object 10.

Examples

An inventive composition, Composition 1, was produced by the method corresponding to that described with reference to FIG. 1, and by using 9 wt % lye of potassium hydroxide, 17 wt % tall oil, 1 wt % triethanolamine, 1 wt % propylene glycol, 0.5 wt % UREA and 71.5 wt % water. That is, Composition 1 was produced by providing a basic solution of the predetermined amount of water and lye of potassium hydroxide, and heating the basic solution to a temperature within 90 to 95° C., to provide a heated basic solution of water and lye of potassium hydroxide. Subsequently, tall oil was added to the heated basic solution during mixing, while the temperature of 90 to 95° C. was kept, whereafter the solution was homogenized by mixing for a predetermined time of 1 hour. As a result, saponification was achieved resulting in a saponified solution of saponified tall oil and saponified lye. The tall oil comprised 17 wt % resin acids as compared to the total weight of the tall oil. pH of the saponified solution was controlled to 9 and triethanolamine and propylene glycol were added to the saponified solution. Subsequently, the saponified solution was naturally cooled down to a cooled temperature of approximately 35° C. and UREA was added to the saponified solution at the cooled temperature, whereby the solution was further cooled down to below 30° C., to provide the resulting composition. Double distilled and deionized (DDD) water was mainly used for comparison.

The use of Composition 1 as an insecticide was examined by performing the following described tests including analysing the behavior of white flies on tobacco leaves, and bench-marking the results with corresponding tests on immature green/black aphids on elderflower bushes and on European Spruce Bark Beetles from a local infested forest. Composition 1 was diluted to a 10% (w/w) solution (Composition 1A) and a 1% (w/w) solution (Composition 1B), using DDD water.

The tests were carried out using a standardised exposure protocol utilizing fine spraying of the respective composition. Biocidal activity was assessed using observation (photography and filming where appropriate), with semi quantitative (subjective) estimation of lethality following agitation of the bearer substratum (leaves and stalks), with voluntary and/or provoked movement.

The test insects were exposed in a Perspex box with lid measuring 25×25×15 cm, which corresponds to a volume of 9.4 L. White flies and aphids were exposed in situ on the leaves and stalks they were collected on, whereas European Spruce Bark Beetles were exposed "in the open". Between exposures, the Perspex box was wiped clean three times with water and dried, to prevent cross-contamination.

A rigid protocol was defined as follows. The test insect sample was placed on the floor of the box, with a 5-minute acclimatization period. The insects were then sprayed with a single burst of fine mist from a standard height above the box (approximate 15 cm), allowing the spray to distribute across the entire surface area of the bottom of the box. The insects were then observed during a 10-minute period, observations recorded and then subjected to agitation. In the case of aphids, the branches were tapped on the floor of the box and the dislodged insects observed for movement. In the case of European Spruce Bark Beetles, the insects were observed on the box floor. Individual tests were repeated three times. The ambient temperature of the room was 27° C.-28° C. over the two test days and relative humidity was 68-70%.

Calibration of the spray mist delivery nozzle revealed that a single continuous depression of the nozzle delivered 1.4+/−0.05 mL material, irrespective of composition (n=12 on all observation). Rough calculations therefore revealed the following delivery of Composition 1 to the boxes: For Composition 1A (10%)=0.14 mL, and for Composition 1B (1%)=0.014 mL. Assuming the volume of the box is 1/100 of 1 m3, this corresponds to delivery of 14 mL/m3 for Composition 1A and 1.4 mL/m3 for Composition 1B.

Result 1: White Flies

Control exposure to DDD water caused no direct changes in movement behavior on the leaves. On agitation, the flies either moved or left the leaf freely.

Treatment with Composition 1B resulted in spontaneous repulsion from the leaf and a visible lack of movement and lack of flight from the substratum from the remaining few individuals after 10 minutes.

The effect of Composition 1B was even more pronounced when Composition 1A was applied. The biocidal effect appears after 1-2 minutes, resulting in increased residual numbers of flies, which were all immotile on agitation.

Result 2: Aphids

It was clearly seen that treatment with DDD water resulted in lack of direct effect on immature aphids, as judged by continued movement, both in situ on the stalk and after "tapping" clean onto the floor of the box.

Treatment with Composition 1B reduced the spontaneous motor activity of the aphids, but they continued to move.

Treatment with Composition 1A resulted in total lack of movement on the substratum and an almost complete lack of movement following mechanical agitation/harvesting.

Result 3: European Spruce Bark Beetles

Direct application of DDD water control was without effect on the beetle's motility. The test animals moved easily around the bottom of the test rig.

When Composition 1A was applied, a progressive biocidal effect (lack of voluntary or forced movement, retracted appendages, lack of righting reflex) began after approximately 30 seconds, which was considerable after 5 minutes and total after 10 minutes, indicating 100% lethality under the conditions of exposure.

Treatment was also performed with a Composition 2 which was based on the same components as Composition 1, but was produced by simply mixing the components without the heating and stirring as for Composition 1. Composition 2 was diluted to a 10% (w/w) solution (Composition 2A) and a 1% (w/w) solution (Composition 2B), using DDD water. Application of Composition 2 corresponded to that described for Composition 1.

For application of Composition 2B, voluntary movement was still present in the beetles (placed on the back for ease of observation), indicating a lack of toxicity/lethality. This was also the case for application of Composition 2A. The test insects were still highly motile.

The above results clearly show the beneficial effect of using Composition 1 as an insecticide. It is believed that the overall size of the spiracle structure correlates to the size of the insect (Arcaz A et al (2016). Desiccation tolerance in *Anopheles coluzzii*: The effects of spiracle size and cuticular hydrocarbons, The Journal of Experimental Biology, 219, DOI 10.1242/jeb.135665). Without being bound by any theory, the use of Composition 1 results in an interference with the gas exchange capacity of the respiratory systems of the insects, e.g. such that the spiracles of the smaller insects "clog" more effectively and quicker than those of larger insects, up to a certain exposure concentration.

Surface Tension, Turbidity and Solubility Measurements

The surface tension, turbidity and solubility of dye of Composition 1 were also analysed in to determine inter alia the critical micelle concentration (cmc). For these analyses, a series of eight samples including samples with reduced concentrations (w/w) of Composition 1 were made using deionized water (Sample 1-8 extending from 0.001% (w/w) to 100% (w/w) Composition 1). The samples were stirred at room temperature overnight. The surface tension and turbidity were measured at the current room temperature, 24° C. The surface tension was measured by the Wilhelmy plate method using a tensiometer Krüss K100SF, a first surface tension measurement 101 (Surf. Tens 1) and a second surface tension measurement 102 (Surf. Tens 2) were carried out (FIG. 5). In the method, a platinum plate, fastened to a balance, was immersed 2 mm in the sample and withdrawn to the position of the liquid surface where the buoyancy force is zero. As known, provided the contact angle is zero between the plate and the sample, the surface tension of the liquid-vapor interface, γLV, is given by the force F on the plate divided with the perimeter L of the platinum plate (γLV=F/L). The turbidity was measured with a turbidimeter (Hach ratio turbidimeter), a first turbidity measurement 201 (Turbidity 1) and a second turbidity measurement 202 (Turbidity 2) were carried out (FIG. 6). A small amount of the water-insoluble dye Fat Red Bluish (≈1 mg, Fluka, for microscopy) was added to the samples and the samples were stirred overnight. Visual inspection of the samples revealed if the dye was dissolved or not. The dye is only solubilised it there are hydrophobic aggregates in the solution that the dye can be dissolved within. The result from the surface tension measurements and the turbidity are shown in Table 2 and FIGS. 5 and 6.

TABLE 2

| Sample | Concentration | Surface tension [mN/m] | Turbidity [NTU] |
|---|---|---|---|
| 1 | 0.001% Composition 1 | 60.8 | 0.2 |
| 2 | 0.002% Composition 1 | 48.9 | 0.9 |
| 3 | 0.005% Composition 1 | 41.2 | 6.4 |
| 4 | 0.01% Composition 1 | 40.5 | 12.6 |
| 5 | 0.02% Composition 1 | 36.9 | 25 |
| 6 | 0.1% Composition 1 | 30.1 | 43.5 |
| 7 | 1% Composition 1 | 26.3 | 1.2 |
| 8 | 100% Composition 1 | 31.3 | 1.4 |

At the lowest concentration the surface tension is high close to the surface tension of water (72 mN/m). The surface tension decreases as the concentration of Composition 1 is increased. Above a certain concentration the surface tension does not change and reaches approximately a constant value (31 mN/m). This concentration is the critical micelle concentration (cmc). Above the cmc any added additional surfactant forms larger aggregates (micelles) in the bulk solution which do not affect the surface tension. FIG. 5 indicates that the cmc for Composition 1 should be around 1 wt %, also shown by the partial solubility of the dye in sample 7 of FIG. 6. The same result as for 1 wt % was obtained with 3 wt % (data not shown). The dye is completely dissolved in sample 8 of Composition 1 indicating the presence of aggregates in the solution into which the dye can be dissolved.

Even though the invention has been described with reference to specific exemplifying embodiments thereof, many different alterations, modifications and the like will become apparent for those skilled in the art. For example, the invention is applicable to outdoor treatments of plant pests or insects by application of the composition or insecticide on an object, e.g. a plant or the soil, as well as indoor treatment of pests and/or vermin by application of the insecticide or composition on an object, e.g. an interior wall. Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for producing a composition comprising:

providing a preheated basic solution of water and a lye, the preheated basic solution having a temperature interval T from 85° C. to 97° C.;

forming micelles by performing saponification by adding tall oil comprising from 10 wt % to 25 wt % resin acids to the preheated basic solution during mixing, to form a saponified solution comprising the micelles, the temperature interval T of the preheated basic solution being maintained during the step of saponification;

wherein the ratio (wt/wt) of the lye to the tall oil used for the saponified solution is between 0.2 and 1.5.

2. The method according to claim 1, wherein the amount of tall oil used for the saponified solution is between 10 wt % and 25 wt %.

3. The method according to claim 1, wherein the lye in the preheated basic solution is sodium hydroxide or potassium hydroxide.

4. The method according to claim 1, wherein the amount of lye used for the saponified solution is between 5 wt % and 15 wt %.

5. The method according to claim 1, comprising: adding at least one of the following to the saponified solution: triethanolamine and propylene glycol, wherein the respective amount of the triethanolamine and propylene glycol is within 0.1 wt % to 2 wt %.

6. The method according to claim 1, further comprising adding a micelle stabilizer to the saponified solution.

7. The method of claim 6, wherein the micelle stabilizer improves the stability of the formed micelles in the saponified solution.

8. The method of claim 6, wherein the micelle stabilizer is present in an amount from 0.1 wt % to 2 wt % as compared to the total weight of the saponified solution.

9. The method of claim 6, wherein the temperature of the preheated basic solution or saponified solution is maintained within temperature range T at least up to the step of adding the micelle stabilizer.

10. The method of claim 6, further comprising prior to adding the micelle stabilizer, cooling the saponified solution to a temperature above room temperature.

11. The method of claim 10, wherein the cooling to the temperature above room temperature comprise cooling to a temperature from 25° C. to 60° C.

12. The method of claim 6, wherein the micelle stabilizer is urea.

13. The method of claim 1, wherein the composition is an insecticide.

14. The method of claim 13, further comprising treating an object with the insecticide to kill, control or repel insects on the object.

15. The method of claim 6, wherein the formed micelles are sized to obstruct the respiratory airways of the insects, pests and/or vermin.

16. The method of claim 1, wherein the step of mixing comprises homogenizing the preheated basic solution with the added tall oil for 30 minutes to 3 hours while maintaining temperature interval T.

17. The method of claim 1, wherein the saponification is performed in a closed vessel to prevent evaporation.

18. The method of claim 6, wherein the resulting composition has a clearing point temperature below 5° C.

19. The method of claim 6, wherein the micelle stabilizer is a base or a diol.

* * * * *